INVENTOR.
JAMES R. MOOREHEAD
BY
Reynolds, Beach & Christensen
ATTORNEYS

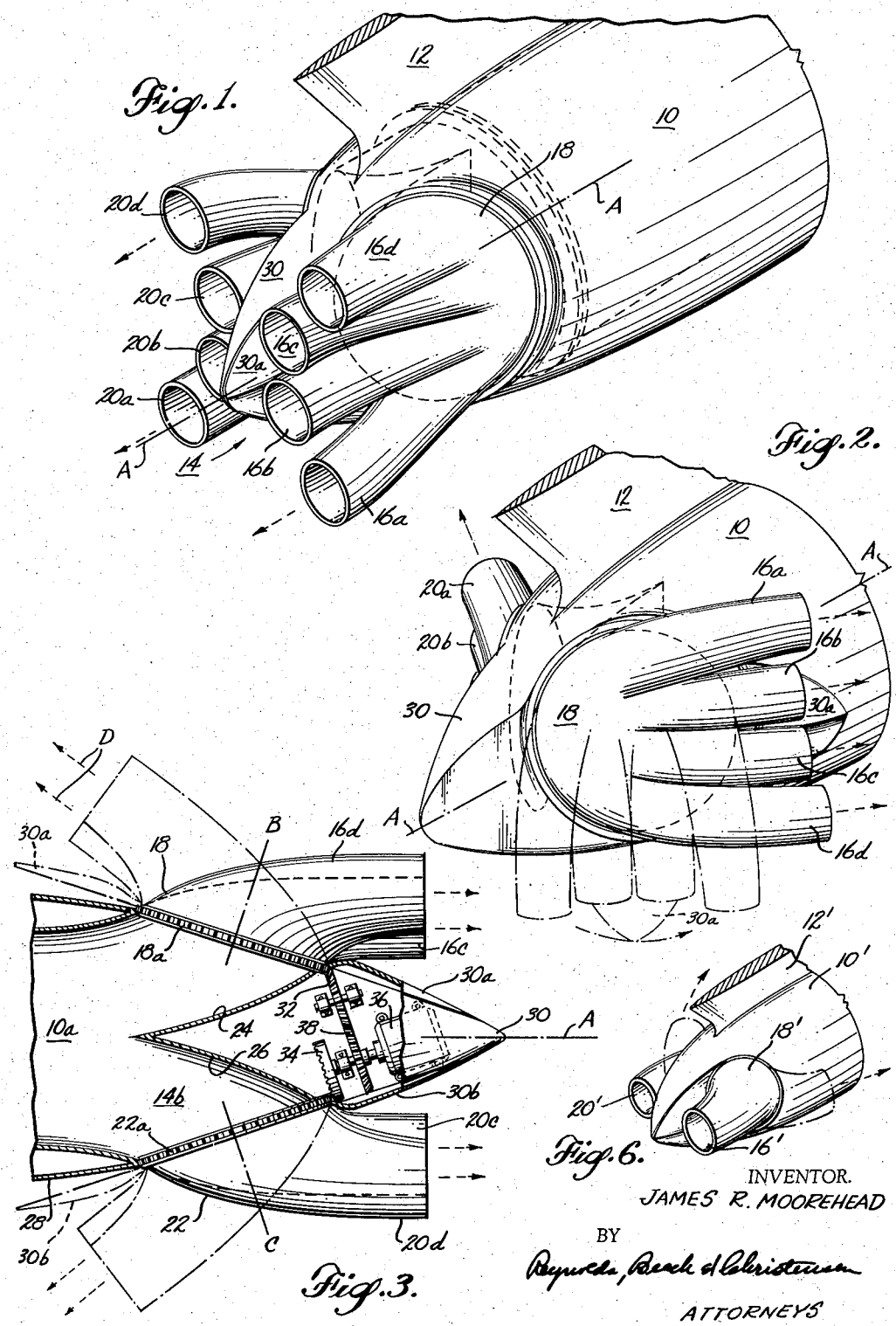

INVENTOR.
JAMES R. MOOREHEAD
BY
ATTORNEYS

United States Patent Office 3,025,667
Patented Mar. 20, 1962

3,025,667
ROTARY TURRET REVERSIBLE THRUST NOISE SUPPRESSION JET ENGINE NOZZLES
James R. Moorehead, Maple Valley, Wash., assignor to Boeing Airplane Company, Seattle, Wash., a corporation of Delaware
Filed July 22, 1957, Ser. No. 673,252
4 Claims. (Cl. 60—35.55)

This invention relates to improvements in jet engines and specifically concerns improved nozzles by which the engine thrust may be reversed at will and by which in the forward-thrust setting thereof jet noise is reduced materially below that of a conventional jet engine. The invention is herein illustratively described by reference to the presently preferred forms thereof; however, it will be evident that certain modifications and changes therein with respect to details may be made without departing from the essential features involved.

An object of the invention is an improved reversible thrust nozzle of relatively simple form both in its construction and its mode of operation.

A related object is such a nozzle which is highly reliable and effective and which may be constructed ruggedly without excessive weight.

An important object is such a nozzle having low-drag characteristics and relatively high thrust efficiency in its forward and reverse-thrust settings and which presents a substantially constant orifice area to the engine in both settings and throughout its transitional movement from one setting to the other, whereby control characteristics of the engine are maintained substantially constant at all times.

Still another object is an improved nozzle of the described type adapted to employ nozzle orifice elements which though of light weight thin-walled material may be so formed as to remain of constant opening area throughout variations of temperature and pressure, whereby the control characteristics of the engine are not affected by these variable conditions.

A further object is a reversible thrust nozzle which may be constructed in a form adapted to decelerate the driven vehicle not only by reverse jet thrust but by drag effect produced by projecting elements in the reverse thrust setting of the nozzle.

A specific object is to accomplish the foregoing objectives in an airplane engine design arrangement which permits the airplane to assume roll attitudes during landing with minimum likelihood of nozzle parts dragging the ground and to permit changing the nozzle setting from forward to reverse thrust without disturbing the stability of flight of the airplane and without danger of scorching or burning engine struts, wings or other adjacent aircraft components.

As herein disclosed an important feature of the improved nozzle means resides in the provision of a plurality of jet discharge tubes spaced apart and normally directed rearwardly, said tubes, preferably round in cross-section at their discharge ends, being rotatively mounted for swinging bodily about oblique axes which are directed generally transversely of the engine to permit swinging of the tubes into forwardly directed positions whereby to reverse the engine thrust. Preferably the construction permits this movement to be executed without disconnecting the tubes nor varying the nozzle opening area, so that engine control characteristics are maintained constant. Another feature resides in the mounting of at least certain of the tubes on a common rotary turret to effect the described movement of the group of tubes conjointly by turret rotation about its generally transverse but oblique axis.

Still another feature resides in the arrangement of turret-mounted tubes in concave arcuate series on each side of the vertical longitudinal mid-plane of the engine installation whereby more open area between tubes for inflow of outside air is afforded for suppression of jet noise. Also scorching of engine mounting struts and other airplane surfaces is avoided and ground clearance is increased, for a given nozzle terminus area, reducing the possibility of dragging of the nozzle should the airplane roll during landing. Preferably the tubes are swung between forward and reverse-thrust positions through an angle of substantially 180 degrees during which movement the jets are directed downwardly by a progressively changing slope.

Longitudinal curvature of the tubes and of the feed or lead duct means carrying gases to them permits the gases to pass through the obliquely disposed rotary joints without materially increasing engine losses. Tail fairing surfaces forming a generally conical tail within the region surrounded or sided by the discharge tubes minimizes base drag.

These and other features, objects and advantages of the invention will become more fully evident from the following description thereof by reference to the accompanying drawings.

FIGURE 1 is a rear perspective view of the presently preferred embodiment of the improved nozzle mounted on a jet engine, shown in part on its supporting strut, and with the tubes in forward-thrust position.

FIGURE 2 is a similar view showing the nozzle in its reverse-thrust setting.

FIGURE 3 is a top view of the same nozzle with parts broken away to show details of construction and a suitable actuating mechanism for the reversible orifice tubes.

FIGURE 6 is a rear perspective view of a modified nozzle installation.

Figure 5:
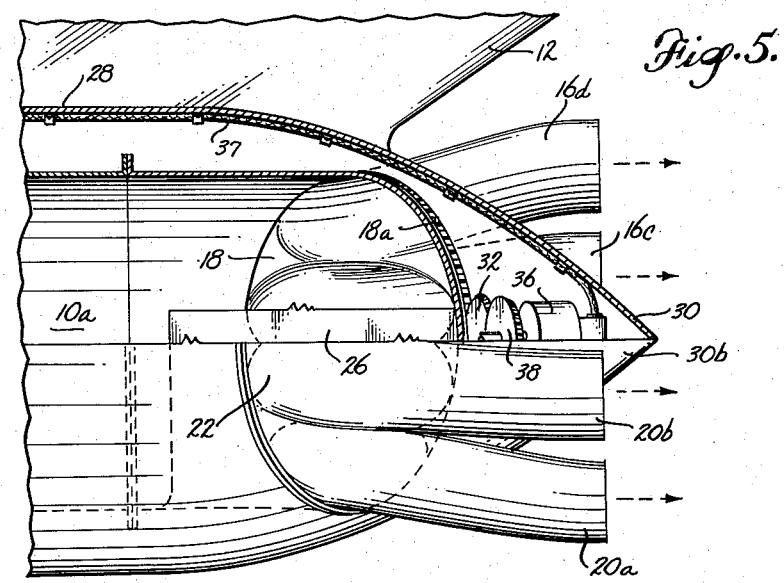
FIGURE 5 is a side view of the installed nozzle with parts broken away to show details.
Figure 4:
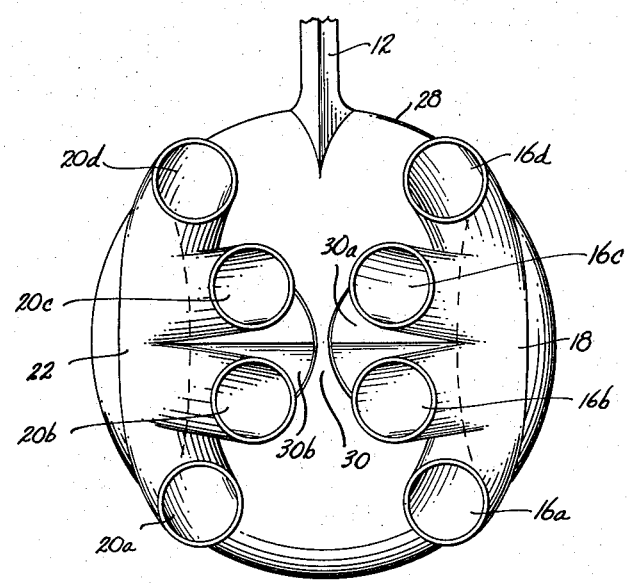
FIGURE 4 is a rear view of the installed nozzle.

As shown in FIGURES 1 to 5, inclusive, the jet engine housing 10 is shown mounted on the lower end of a wing strut 12 which in most installations depends from the underside of the main wing of the airplane. Within the engine housing 10 are mounted the necessary operating components of the jet engine and since these are of conventional form no illustration or special description thereof is considered necessary herein. The space 10a generally represents a space or chamber within which hot gases under pressure are received or accumulated for discharge through the nozzle. Such space may be formed within the nozzle proper or within the rearward portion of the engine housing behind the turbine (not shown), depending upon where the parting line between the nozzle proper and the engine housing is established. The nozzle 14 mounted on the engine housing in this embodiment comprises a group of four nozzle discharge tubes 16a, 16b, 16c and 16d mounted on a rotary turret 18 situated on one side of a longitudinal midplane containing the engine axis A, and a second group of nozzle discharge tubes 20a, 20b, 20c and 20d mounted on a similar rotary turret 22, situated on the opposite side of the longitudinal mid-plane. Preferably all of the tubes are of circular cross-section at their discharge ends, which ends lie substantially in a common plane perpendicular to axis A. The discharge ends of the tubes in each group lie in a concave arcuate series, with the tubes 16b and 16c being located nearer the axis A than the tubes 16a and 16d, and with a similar arrangement existing for the tubes in the other group. The base of the rotary turret 18 is circular and is disposed in a plane which is oblique for the axes of discharge of the tubes and which is centered on an axis of rotation B extending generally transverse to the axis A. The turret 18 and the tubes 16a, etc. comprise discharge duct means to which hot gases from the engine are fed by lead duct means in the form of the curved duct 24 which forms part of or communicates with the pressure chamber 10a. In order for the discharge from tubes 16a, 16b, etc. to have a forward component for reverse thrust purpose with the turrets rotated forward it will be evident that the acute angle between axes A and B must exceed 45° and is preferred that it be a large angle, as shown, not greatly less than 90° so that a large component of reverse thrust is attainable for dynamic braking purposes. The turret 22 is similarly formed and disposed, with its base centered on the axis C and in a position to receive hot gases under pressure from the lead duct 26 comprising part of or communicating with the chamber 10a. Preferably the ducts 24 and 26 diverge rearwardly, curving outwardly away from the axis A whereas the turrets 18 and 22, and with them the ducts 16 and 20 extend in alignment with the respective lead ducts 24 and 26 at the bases of the respective turrets, and then curve rearwardly and inwardly into substantially parallel relation to the axis A so that the rearward discharge from each of the tubes is substantially parallel to the axis A. The ends of the lead ducts 24 and 26 are circular and are formed complementally to the circular bases of the respective turrets 18 and 22 to form a rotary joint therebetween permitting turret 18 to rotate about axis B and turret 22 to rotate about axis C.

As a result of the inclination of the plane of the base of turret 18 and the curved or bent form of the ducts projecting therefrom, rotation of the turret 18 about axis B through 180 degrees from its solid-line position shown in FIGURE 3 to its broken-line position shown in the same figure positions the ducts to direct their discharge with a substantial forward component as shown by the arrows D, thereby reversing engine thrust. Similar rotation of the turret 22 produces a like effect on the opposite side of the engine. The gradual curvatures of the lead ducts and of the discharge duct means passing through the rotary joints leads the gases from the chamber 10a to the discharge orifices of such ducts with minimum loss of efficiency. The outer engine cowl or shroud 28 is faired into the bases of the rotary turrets for minimizing base drag, and is faired into a tail cone or fairing 30 which tapers rearwardly from the bases of the turrets in the spaces between the groups of tubes in order to minimize base drag of the engine. The tapered fairing 30 in effect takes the place of a plug or tail cone commonly used in certain forms of jet engines insofar as reduction of base drag is concerned where there is or may be a dead space or pocket immediately behind the center of the nozzle which could produce flow separation, hence energy-dissipating shock waves at high speeds.

In the illustrated embodiment the orifice area of each discharge tube 16 and 20 is substantially the same and it is therefore desirable that the entrance area of each such tube be the same as that of the other tubes so that the velocity of flow of gases leaving the tubes will be substantially the same in all cases. The rearward divergence or angularity between the axes B and C may vary in design from substantially zero to an acute angle, although for reasons of air flow design and efficiency of ducting the gases from the chamber 10a to the discharge tubes it is preferred that this angle be of the order of 135 degrees more or less.

While the hollow tube-supporting rotary turrets 18 and 22 may be rotatively positioned in any manner and by any suitable means to effect thrust reversal one convenient arrangement is to provide a ring gear or segment on the base of each such turret and pinions to drive these ring gears. In the example the ring gear 18a is mounted on the turret 18 and the ring gear 22a is mounted on the turret 22. A pinion 32 engages the ring gear 18a and a pinion 34 engages ring gear 22a. A motor 36 drives a gear 38 which meshes with pinion 32 to rotate the latter. The pinion 34 is mounted on the same shaft as the gear 38, hence rotates therewith. A suitable conduit 37 extends to the motor 36 through the space between the shroud 28 and the engine chamber shell. The arrangement is such that the turrets are rotated simultaneously at the same speed but in opposite directions. The directions of rotation are so determined that the two turrets move through the lower arcs of 180 degrees in swinging from the forward to the reverse-thrust setting, and vice versa. Consequently, the continuous jets of gas which issue from the tubes during the transition between forward and reverse-thrust in every case are directed downwardly by progressively varying slopes, rather than upwardly. This is done so that the strut 12 and the supporting wing of the airplane or other structure will not be scorched during the process of changing the nozzle setting and so that the airplane will not be driven toward the ground during the reversal process. The broken-line position of the tubes 16 on turret 18 in FIGURE 2 illustrates an intermediate position of these elements during the process of transition.

The concavely arcuate curvature of the series arrangement of the tubes 16a, 16b, 16c and 16d minimizes the vertical spread of the nozzle for a given distance of separation laterally between the tubes. This is also true of the series of tubes 20. Consequently, should the airplane roll during landing there will be less chance for the lower nozzle tubes to skid on the ground. Furthermore, such series arrangement of the two groups of tubes has the effect of forming in this case four radial series of two tubes each, as the spokes of a wheel, with the quadrant or sectoral spaces defined therebetween representing wide open spaces into which outside air may flow efficiently in order to reach the regions between the separate discharges from the tubes and thereby promote rapid admixture of such air with the hot gases to suppress engine noise, particularly low-frequency noise, and to prevent recombining of the discrete jets. Furthermore, this concave arrangement of the series of tubes places the tubes 16c, 16b, 20c and 20b near the engine axis and thereby minimizes the base area in which separation of flow may develop. Consequently, the base drag of a nozzle of this configuration is minimized.

If desired, the base of turret 18 may carry a flap 30a which in the normal position of the turret lies along the adjacent side of the fairing 30 and in the reverse-thrust position of the turret projects forwardly and outwardly as shown in FIGURE 2. In this latter position of the flap it functions, as do the nozzle discharge tubes themselves when projected transversely, as a wind catch resisting the forward travel of the airplane and thereby assisting in the deceleration thereof. A similar flap 30b may be mounted on the turret 22. Also these flaps act as gas deflectors which in the reverse-thrust position shield the sides of the engine from the discharges of the two innermost tubes on each side of the nozzle.

In the modification shown in FIGURE 6 the turret 18′ carries a single large discharge duct 16′ and the opposing turret carries a similar single large discharge duct 20′, replacing the cluster or group of ducts disclosed in the previous embodiment. Such a nozzle arrangement is not as effective as that shown in the first described embodiment for noise suppression purposes but does embody the principle of thrust reversal with tubular discharge ducts mounted to rotate on oblique axes disposed generally transversely to the longitudinal axis of the engine. If desired, separate engines may be provided feeding the individual ducts 16′ and 20′, such engines being mounted in a single pod 10' supported on the strut 12'. Alternatively, a single engine may be used to supply gas to both ducts as shown in the first embodiment.

Figure 7:
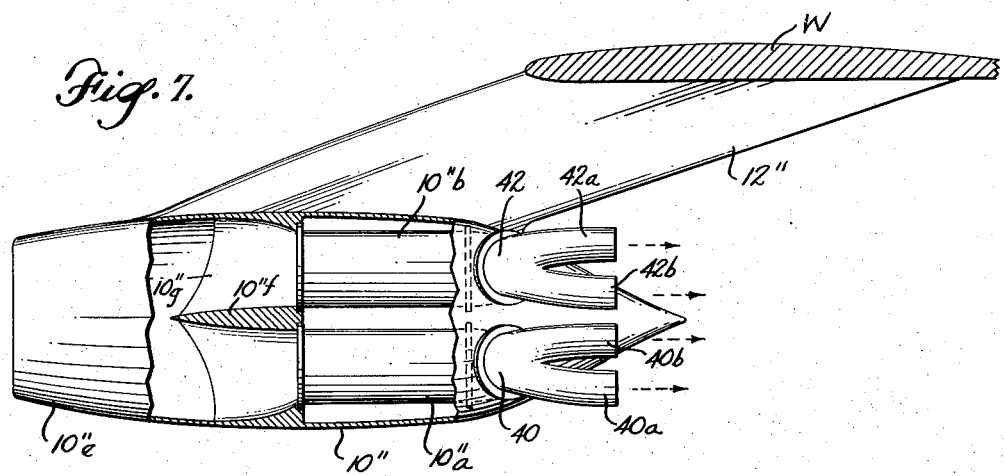
FIGURE 7 is a side view of a further modification.
Figure 8:
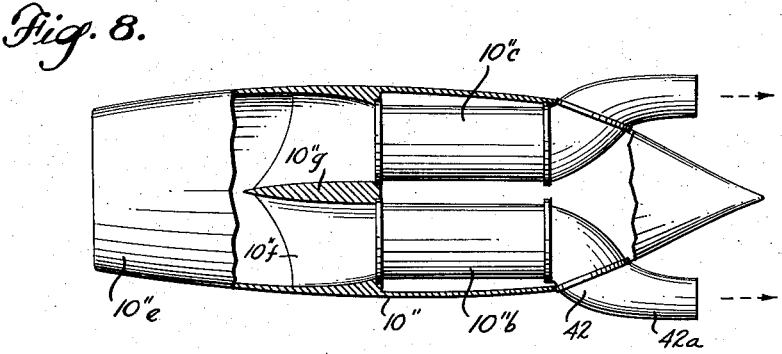
FIGURE 8 is a top view of the latter modification with the nozzle tubes in the forward-thrust setting.
Figure 9:
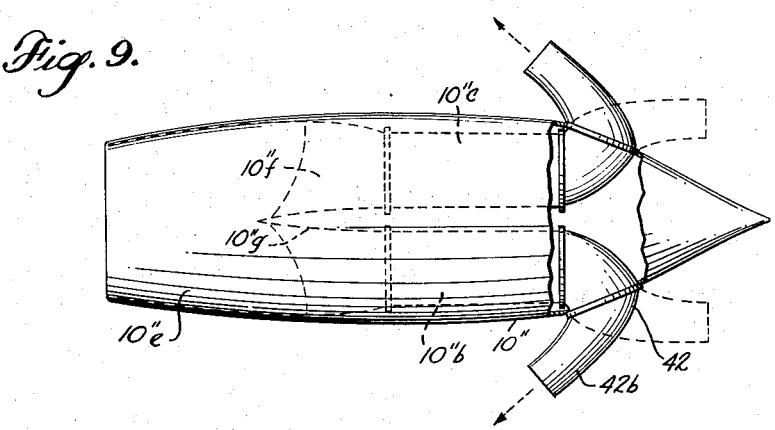
FIGURE 9 is a top view of the same modification with the nozzle tubes in the reverse-thrust setting.

In the embodiment shown in FIGURES 7, 8 and 9, the engine installation comprises a multi-engine pod 10" mounted on strut 12" which is carried by the airplane wing W. In this instance four smaller engines 10"a, 10"b, etc., are incorporated in parallel positions in the pod nacelle, with a common air inlet 10"e, of generally tubular form. Air entering the inlet 10"e is directed to the inlets of the respective engines through ducts formed by the radial partitions 10"f and 10"g which intersect each other at 90 degrees to form four ducts of equal cross-section. Each engine delivers its combustion products to separate nozzle turrets, each of which has two branch discharge tubes. Thus the engine 10"a is associated with the nozzle turret 40 havng branch discharge tubes 40a and 40b positioned in peripherally spaced relationship whereas the engine 10"b is connected to the turret 42 havng spaced branch discharge tubes 42a and 42b. The remaining two engines have similar turrets and discharge tubes, making a total of eight discharge tubes in all arranged in spaced relationship in two series on respectively opposite sides of the longitudinal vertical midplane of the engine. The actuating means (not shown) for swinging these nozzle turrets into the reverse-thrust setting is arranged to swing the turrets 40 and 42 on one side of the engine through a downwardly extending arc of 180 degrees. The turrets on the opposite side of the engine are also actuated through a downwardly extending arc of 180 degrees into the reverse-thrust position. Preferably these turrets are actuated between positions simultaneously so as to prevent any net torque developing about the engine axis which would disturb the lateral stability of the airplane. In the case of an airplane having similar installations on opposite sides of the fuselage, all turrets will be actuated simultaneously in order to maintain lateral control stability.

It will therefore be evident that the invention has application in a number of types of engine installations involving one or more engines mounted in the same pod and that the number of discharge tubes in each engine may vary as may the number of tubes mounted on or supplied by a single lead duct or turret. However, in order to obtain beneficial noise suppression effect from the division and separation of the discharge gases into a plurality of separate laterally spaced jet streams it is desirable to employ at least six tubes producing six separated discharges between and along which outside air may flow for promoting rapid cooling and mixture of the gases with the surrounding air. The principle of noise suppression effected by dividing the discharge of a jet engine into a plurality of branch streams or separate streams is disclosed in the patent application of George S. Schairer, Serial No. 562,050, filed January 3, 1956, entitled Jet Engine Noise Suppression, and assigned to the same assignee as the assignee of this application, now abandoned. The principle of a plurality of separate round discharge tubes mounted in spaced relation for a noise suppression nozzle of constant performance characteristics throughout variations of temperature and pressure is disclosed in co-pending application Serial No. 678,862, filed August 19, 1957, in the name of Merle B. McKaig for Multitube Noise Suppression Nozzle Means for Jet Engines, now abandoned.

Having described the invention by reference to its preferred embodiments it will be evident to those skilled in the art that the invention achieves the objectives set forth hereinabove and that the same principles may be employed and the same objectives achieved in modified forms as well.

I claim as my invention:

1. In a gas stream thrust reaction engine, a streamlined housing disposed in the airstream with its longitudinal axis disposed generally in the direction of forward thrust and having lead duct means for containing and guiding gases under pressure in said engine, said lead duct means being closed rearwardly except as provided with circular outlets at opposite sides of the rear end of said housing, which outlets have their axes inclined generally outwardly but somewhat rearwardly with respect to the housing; a corresponding number of noise suppression nozzle means, each including a lead duct means having a circular base, and supported at the corresponding housing outlets for rotation about the axes of such outlets, and communicating at all times with the lead duct means of the housing for discharge of gas, each nozzle means including a plurality of separated nozzle outlets each communicating with its lead duct means and offset from the axis of rotation, and directed rearwardly generally parallel to the longitudinal axis of the housing when parts are in the forward-thrust position, but directed outwardly away from the housing and forwardly, by reason of the inclination of the axis of rotation, when parts are in the rearward-thrust position, whereby forwardly directed gases will not impinge on the housing, and means to rotate the noise-suppression nozzle means about their axes of rotation between forward-thrust position and rearward-thrust position.

2. In a gas stream thrust reaction engine, a streamlined housing having its longitudinal axis disposed generally in the direction of forward thrust and having lead duct means for containing and guiding means terminating rearwardly at two circular outlets at each of the respectively opposite sides of the rear end of said housing, which outlets at each side have their axes inclined generally outwardly but somewhat rearwardly; four noise suppression nozzle means each including a lead duct means having a circular base and each supported upon the corresponding one of the four housing outlets for rotation about the axes of such outlets, and communicating with the lead duct means of the housing, each nozzle means including two separated nozzle outlets each communicating with its lead duct means and offset from the axis of rotation, and directed rearwardly generally parallel to the longitudinal axis of the housing when parts are in the forward-thrust position, but directed outwardly away from the housing and forwardly, by reason of the inclination of the axis of rotation, when parts are in the rearward-thrust position, whereby forwardly directed gases will not impinge on the housing, and means to rotate the noise suppression nozzle means about their axes of rotation between forward-thrust position and rearward-thrust position.

3. In a gas stream reaction engine, a streamlined housing having a conical tip at its rear end, and disposed in the airstream with its longitudinal axis disposed generally in the direction of intended forward thrust, lead duct means within said housing for containing and guiding thrust-producing gas under pressure, rotational mounts disposed near the conical tip of said housing, one at each side and in a substantially vertical plane inclined generally outwardly and somewhat rearwardly, a pair of turrets each formed with a circular base fitting and rotative relative to its respective rotational mount, discharge duct means carried by the respective turrets and projecting thence into the airstream first outwardly and then radially of its turret, and communicating with said lead duct means for discharge of gas, means to rotate said turrets between a forward-thrust position, wherein the discharge duct means are directed rearwardly and generally parallel to the longitudinal axis of the housing, and a reverse-thrust position, wherein the same are directed generally forwardly but somewhat outwardly, a flap secured to each turret, the conical tip of the housing having planar recesses of a shape, size, and so disposed as to receive the respective flaps when the turret is in its forward-thrust position, but the flaps projecting into the airstream when the turret is in its reverse-thrust position, to deflect discharging gases from the housing.

4. In a gas stream thrust reaction engine, a housing having a longitudinal axis and having lead duct means to contain and guide gases under pressure in such engine, and terminating in two circular lead duct outlets at opposite sides of said housing, each having its axis directed horizontally and generally outwardly and rearwardly at an angle approaching but less than 90° to the longitudinal axis of the housing, two lead duct outlets each formed with a circular base fitting and rotatable about the respective lead duct outlets of the housing, a plurality of transversely spaced noise-suppressing nozzles branching from each circular base and directed generally rearwardly parallel to the longitudinal axis of the housing when in forward-thrust position, the discharge outlets of the nozzles of each base being arranged in arcuate series, convexly curved on the side of each series that faces the opposite series, and means to rotate the two bases of the lead duct outlets, and their nozzles, simultaneously and in respectively opposite and downward rotative senses, through substantially 180°, to direct the nozzle series forwardly and somewhat outwardly, into reverse-thrust position.

References Cited in the file of this patent

UNITED STATES PATENTS

| | | |
|---|---|---|
| 2,024,274 | Campini | Dec. 17, 1935 |
| 2,601,104 | Douglas | June 17, 1952 |
| 2,633,703 | Tenney et al. | Apr. 7, 1953 |
| 2,857,740 | Hall et al. | Oct. 28, 1958 |
| 2,865,169 | Hausmann | Dec. 23, 1958 |
| 2,866,316 | Towle et al. | Dec. 30, 1958 |
| 2,944,392 | Tyler | July 12, 1960 |
| 2,986,877 | Emmons et al. | June 6, 1961 |

FOREIGN PATENTS

| | | |
|---|---|---|
| 621,329 | Great Britain | Apr. 7, 1949 |
| 1,066,499 | France | Jan. 20, 1954 |
| 743,874 | Great Britain | Jan. 25, 1956 |
| 744,196 | Great Britain | Feb. 1, 1956 |